(12) United States Patent
Nagayama et al.

(10) Patent No.: US 10,549,257 B2
(45) Date of Patent: Feb. 4, 2020

(54) GAS ADSORBING MATERIAL PARTICLE, GAS ADSORBING MATERIAL BODY, MAKING METHOD OF THE SAME AND VACUUM INSULATION MATERIAL INCLUDING THE SAME

(71) Applicant: SAMSUNG ELECTRONICS CO., LTD., Suwon-si, Gyeonggi-do (KR)

(72) Inventors: Kenichi Nagayama, Yokohama (JP);
Kenji Takeuchi, Yokohama (JP);
Tomokazu Fukuzaki, Yokohama (JP)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 246 days.

(21) Appl. No.: 15/611,234

(22) Filed: Jun. 1, 2017

(65) Prior Publication Data

US 2017/0348669 A1 Dec. 7, 2017

(30) Foreign Application Priority Data

Jun. 1, 2016 (JP) .................................. 2016-110262

(51) Int. Cl.
| | | |
|---|---|---|
| *B01J 20/00* | (2006.01) | |
| *B01J 20/04* | (2006.01) | |
| *B01D 53/04* | (2006.01) | |
| *B01D 53/26* | (2006.01) | |
| *B01J 20/02* | (2006.01) | |
| *B01J 20/28* | (2006.01) | |

(Continued)

(52) U.S. Cl.
CPC ........ *B01J 20/041* (2013.01); *B01D 53/0407* (2013.01); *B01D 53/261* (2013.01); *B01J 20/0211* (2013.01); *B01J 20/0225* (2013.01); *B01J 20/04* (2013.01); *B01J 20/28004* (2013.01); *B01J 20/28016* (2013.01); *B01J 20/28042* (2013.01); *B01J 20/3035* (2013.01);
(Continued)

(58) Field of Classification Search
CPC .. B01J 20/041; B01J 20/3236; B01J 20/0211; B01J 20/0225; B01J 20/04; B01J 20/28004; B01J 20/28016; B01J 20/28042; B01J 20/3035; B01J 20/3204; B01J 2220/42; B01D 53/0407; B01D 53/02; B01D 53/261; B01D 2255/20707; B01D 2255/2042; B01D 2255/2025; B01D 2255/1023; B01D 2253/304; B01D 2251/602; B01D 2251/408; B01D 2251/404; B01D 2251/302; B01D 2253/1122; B01D 2253/1124; B01D 2253/25; B01D 2257/102; B01D 2257/104; B01D 2257/108; B01D 2257/80; B01D 2255/2045
USPC ....................................................... 502/400
See application file for complete search history.

(56) References Cited

U.S. PATENT DOCUMENTS

| 5,544,490 A | 8/1996 | Manini et al. |
| 5,600,957 A | 2/1997 | Manini et al. |

(Continued)

FOREIGN PATENT DOCUMENTS

| JP | 08159377 A | 6/1996 |
| JP | 09512088 A | 12/1997 |

(Continued)

*Primary Examiner* — Haytham Soliman
(74) *Attorney, Agent, or Firm* — Cantor Colburn LLP (57) ABSTRACT

A gas adsorbing material particle includes an additive material particle having a moisture adsorption property; and a layer of a gas adsorbing metal disposed on a surface of the additive material particle, wherein the gas adsorbing metal is inactivated by moisture and adsorbs a target gas, wherein an average thickness of the layer of the metal is less than or equal to about 37 micrometers.

14 Claims, 7 Drawing Sheets

(51) Int. Cl.
*B01J 20/30* (2006.01)
*B01J 20/32* (2006.01)

(52) U.S. Cl.
CPC ....... *B01J 20/3204* (2013.01); *B01J 20/3236* (2013.01); *B01D 2253/1122* (2013.01); *B01D 2253/1124* (2013.01); *B01D 2253/25* (2013.01); *B01D 2257/102* (2013.01); *B01D 2257/104* (2013.01); *B01D 2257/108* (2013.01); *B01D 2257/80* (2013.01); *B01J 2220/42* (2013.01)

(56) References Cited

U.S. PATENT DOCUMENTS

| | | |
|---|---|---|
| 5,885,682 A | 3/1999 | Tanimoto et al. |
| 6,200,494 B1 | 3/2001 | Manini et al. |
| 7,833,327 B2 | 11/2010 | Hirai et al. |
| 8,940,084 B2 | 1/2015 | Kojima et al. |
| 9,205,368 B2 | 12/2015 | Hashida |
| 2016/0114310 A1 | 4/2016 | Sato et al. |

FOREIGN PATENT DOCUMENTS

| | | |
|---|---|---|
| JP | 2007016929 A | 1/2007 |
| JP | 4797387 B2 | 10/2011 |
| JP | 2012102758 A | 5/2012 |
| JP | 2012217942 A | 11/2012 |
| JP | 2014213240 A | 11/2014 |
| JP | 2015104704 A | 6/2015 |
| KR | 100408327 B1 | 11/2003 |
| KR | 101369525 B1 | 2/2014 |
| KR | 1020160048681 A | 5/2016 |
| WO | 2013140805 A1 | 9/2013 |

GAS ADSORBING MATERIAL PARTICLE, GAS ADSORBING MATERIAL BODY, MAKING METHOD OF THE SAME AND VACUUM INSULATION MATERIAL INCLUDING THE SAME

CROSS-REFERENCE TO RELATED APPLICATION

This application claims priority to and the benefit of Japanese Patent Application No. 2016-110262, filed on Jun. 1, 2016, in the Japanese Intellectual Property Office, and all the benefits accruing therefrom under 35 U.S.C. § 119, the content of which in its entirety is incorporated herein by reference.

BACKGROUND

1. Field

A gas adsorbing material particle, a gas adsorbing material body, a making method of the gas adsorbing material particle, a method of making the gas adsorbing material body, and a vacuum insulation material including the gas adsorbing material body are disclosed.

2. Description of the Related Art

Electronic appliances or facility equipment may include a vacuum insulation material having an improved insulation effect according to an energy-saving tendency. The vacuum insulation material is prepared by covering a core material having a microporous structure, such as glass wool, a silica powder, or the like, with an exterior material having gas barrier properties, and then sealing the core material inside the exterior material under a reduced pressure.

In the above-mentioned vacuum insulation material, an adsorption material capable of removing aqueous vapor or gases such as oxygen, nitrogen, and the like, may be sealed with the core material under a reduced pressure in order to maintain improved insulation effects over an extended period of time.

SUMMARY

An embodiment provides a gas adsorbing material particle capable of reducing a generation amount of a combustible gas while suppressing deterioration of gas adsorption performance and a method of making the gas adsorbing material particle.

A gas adsorbing material body including a gas adsorbing material particle according to an embodiment, a method of making the gas adsorbing material body, and a vacuum insulation material including the gas adsorbing material body are also provided.

According to an embodiment, a gas adsorbing material particle includes an additive material particle having a moisture adsorption property and a layer of a gas adsorbing metal disposed on a surface of the additive material particle, wherein the gas adsorbing metal is inactivated by moisture and adsorbs a target gas, and wherein an average thickness of the layer of the metal is less than or equal to about 37 micrometers ($\mu m$).

The additive material particle may include about 90 mass percent (mass %) or greater of calcium oxide and the gas adsorbing metal may include about 90 mass % or greater of a Ba—Li alloy.

A content of the gas adsorbing metal may be less than or equal to about 45 mass % based on a total mass of the additive material particle and the metal.

An average thickness of the layer of the gas adsorbing metal may be about 0.65 $\mu m$ to about 37 $\mu m$ or about 1.3 $\mu m$ to about 6.6 $\mu m$.

The target gas may be nitrogen.

The additive material particle may be coated by the layer of the gas adsorbing metal.

According to another embodiment, a method of making the gas adsorbing material particle includes heating the additive material particle at a temperature greater than or equal to a melting point the gas adsorbing metal, in an inert gas atmosphere, adding the gas adsorbing metal to the heated additive material particle, mixing the gas adsorbing and the additive material particle to coat a surface of the additive material particle with the gas adsorbing metal, and cooling a resultant mixture to form the gas adsorbing material particle.

During the mixing the gas adsorbing metal may be mixed with the additive material particle so that a generation amount of a combustible gas released from the gas adsorbing material may be less than about 200 cubic centimeters per gram (cc/g) of the gas adsorbing metal.

According to another embodiment, a gas adsorbing material body includes a gas adsorbing material layer including a gas adsorbing material particle including an additive material particle having one or more moisture adsorption properties and a layer of a gas adsorbing metal disposed on a surface of the additive material particle, wherein the gas adsorbing metal is inactivated by moisture and adsorbs a target gas, and wherein an average thickness of the layer of the layer of the gas adsorbing metal is less than or equal to about 37 $\mu m$; and a coating layer disposed on a surface of the gas adsorbing material layer and including a moisture adsorbing material.

The coating layer may further include a gas adsorbing material having oxygen and hydrogen adsorption properties.

The moisture adsorbing material may be calcium oxide and the gas adsorbing material of the coating layer may include titanium oxide, palladium oxide, or a combination thereof.

The gas adsorbing material body may have a pellet shape.

A maximum thickness of the coating layer may be about 1 millimeter (mm) to about 60 mm, or about 2 mm to about 40 mm, or about 5 mm to about 20 mm.

According to another embodiment, a method of making the gas adsorbing material body includes: compacting the gas adsorbing material particle in an inert gas atmosphere to obtain the gas adsorbing material layer, coating a surface of the gas adsorbing material layer with a coating material including the moisture adsorbing material, and pressing the gas adsorbing material layer coated with the coating material to form the gas adsorbing material body.

A vacuum insulation material includes the gas adsorbing material body.

DETAILED DESCRIPTION

Hereinafter, exemplary embodiments will hereinafter be described in detail, and may be easily performed by a person skilled in the art. However, this disclosure may be embodied in many different forms and is not construed as limited to the example embodiments set forth herein. Rather, these embodiments are provided so that this disclosure will be thorough and complete, and will fully convey the scope of the invention to those skilled in the art. Like reference numerals refer to like elements throughout.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±20%, 10% or 5% of the stated value.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A vacuum insulation material may include a Ba—Li alloy as a nitrogen gas adsorbing material. In general, a Ba—Li alloy is a water-prohibiting material classified as a third class dangerous substance according to the Japanese Fire Safety Act, and immediately loses gas adsorption performance and simultaneously generates hydrogen when it reacts with water.

The vacuum insulation material may be spray-treated with water to prevent dust-scattering when electronic appliances are destroyed. Herein, when the internal gas adsorbing material inside the vacuum insulation material is destroyed, the gas adsorbing metal is exposed and then, contacts water and rapidly generates a large amount of hydrogen, and thus there is a danger of ignition and explosion.

Specifically, a reaction of a Ba—Li alloy with water is expressed by Reaction Schemes 1 and 2 below, which show that Ba and Li respectively react with water and generate hydrogen gas.

$2Li + 2H_2O \rightarrow 2LiOH + H_2 (295 \text{ cc/g})$ [Reaction Scheme 1]

$Ba + 2H_2O \rightarrow Ba(OH)_2 + H_2 (147 \text{ cc/g})$ [Reaction Scheme 2]

Referring to Reaction Schemes 1 and 2, when a bulk-type or a particle phased Ba—Li alloy is, for example, molded under a pressure into a chunk and then reacted with water, the Ba—Li alloy generates hydrogen gas in an amount of about 442 cubic centimeter per gram (cc/g) in total.

According to a test reference which determines whether a material belongs to a third class of a dangerous substance according to Japanese Fire Safety Act, a solid generating about 200 cc/g or greater of a combustible gas such as hydrogen, and the like, through a reaction with water is classified as a water-prohibiting material.

The test reference may be satisfied by controlling generation of a combustible gas to an amount of less than about 200 cc/g per gram during the reaction with water. Accordingly, in order to reduce an amount of hydrogen gas generated during the water-spraying treatment down to a safe level, research into a method of reducing an amount of the Ba—Li alloy per unit mass by including an additive material such as an absorbing material, and the like, with the Ba—Li alloy, has been initiated.

However, the inventors have found a problem of not realizing desired gas adsorption performance, since the Ba—Li alloy is inactivated by even a small amount of moisture included in the additive material when the additive material is increased.

Accordingly, as described herein, the inventors have advantageously discovered a material which is capable of reducing the generation amount of a combustible gas as well as suppressing deterioration of gas adsorption performance. The material is obtained by covering the surface of an additive material particle with a metal having gas adsorption properties, as shown in an embodiment.

Figure 1:
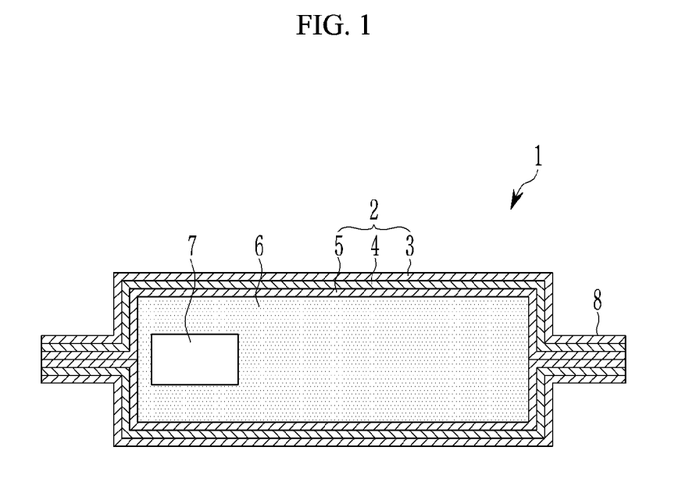
FIG. 1 is a schematic cross-sectional view showing a vacuum insulation material including a gas adsorbing material body, according to an embodiment.

FIG. 1 is a schematic cross-sectional view showing a vacuum insulation material including a gas adsorbing material body according to an embodiment.

A vacuum insulation material 1 according to an embodiment includes a core material 6 having a microporous structure, for example a material such as glass wool or a silica powder, and a gas adsorbing material body 7, each of which is disposed between two sheets of an exterior material 2 and is closed and sealed as shown in FIG. 1.

The vacuum insulation material 1 may be, for example, used in a refrigerator, a freezer, a hot water supply, as a heat insulation material for an automobile, a heat insulation material for a building, a vending machine, a cold reserving box, a thermostatic box, a cold reserving car, and the like.

The exterior material 2 may play a role in separating the core material 6 from ambient air or moisture. The exterior material 2 may include various materials having gas barrier properties.

The exterior material 2 may be, for example, a plastic film comprising, consisting of, or consisting essentially of a thermoplastic resin or a laminate film having gas barrier properties, and which is obtained by lamination-processing of a metal foil.

Referring to FIG. 1, the exterior material 2, according to an embodiment, may include a heat-fusion film 5 corresponding to an internal layer, a gas barrier film 4 corresponding to an intermediate layer, and a surface protective film 3 corresponding to an outermost layer.

In an embodiment, the heat-fusion film 5 may include for example a polyolefin (e.g., a low density polyethylene, a high density polyethylene, a linear low density polyethylene, or a combination thereof), a thermoplastic resin such as an ethylene-vinyl acetate copolymer, and the like, or a combination thereof.

In an embodiment, the gas barrier film 4 may be, for example, a metal foil such as aluminum or copper, or a film including a metal atom such as aluminum or copper, or a metal oxide such as alumina or silica deposited on a polyester film such as a polyethylene terephthalate film, or another polymer film such as an ethylene-vinyl alcohol copolymer.

In an embodiment, the surface protective film 3 may include, for example, a polyamide (e.g., nylon etc.), a polyester, a polyolefin, a polyimide, a polymethylmethacrylate (PMMA), or a combination thereof.

Alternatively, the exterior material 2 in an embodiment, may be a metal container, a glass container, a gas barrier container including a laminate of a polymer resin and a metal, and the like, used either alone or in addition to the laminate film. For example, the exterior material 2 may be a laminate container of one or more film selected from polyvinylidene chloride, polyvinyl alcohol, polyester, polypropylene, polyamide, polyethylene, and a metal deposition film. A combination comprising at least one of the foregoing may also be used.

The core material 6 may be disposed inside of the exterior material 2 and may play a role of a backbone of the vacuum insulation material 1 and simultaneously provide a space for applying the gas adsorbing material body 7, as shown in FIG. 1.

In an embodiment, materials of the core material 6 are not particularly limited and may be for example an inorganic fiber such as glass wool, rock wool, an alumina fiber, and the like; a metal fiber consisting of a metal having thermal conductivity; a synthetic fiber like polyester, polyamide, acryl, polyolefin, aramid, and the like; an organic fiber such as a cellulose manufactured from wood pulp, a natural fiber like cotton, hemp, cloth, wool, silk, and the like; or a recycled fiber like rayon, or a semi-synthetic fiber like acetate. A combination comprising at least one of the foregoing may also be used.

The core material 6 may be used alone or as a mixture of two or more. In an embodiment, the core material 6 is glass wool. The core material formed of these materials has high elasticity and low thermal conductivity and may be available at a low cost.

Figure 2:
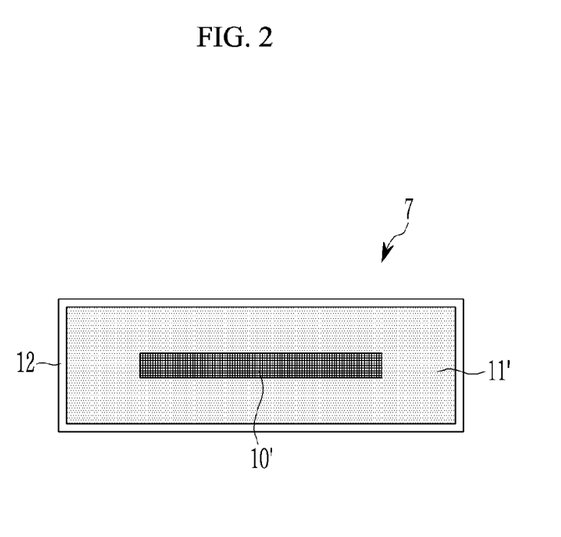
FIG. 2 is a schematic cross-sectional view showing the gas adsorbing material body of the vacuum insulation material of FIG. 1.

FIG. 2 is a schematic cross-sectional view showing the gas adsorbing material body 7 of the vacuum insulation material of FIG. 1

In an embodiment, the gas adsorbing material body 7 may have a structure in which a compression molded body consisting of a gas adsorbing material layer 10' and a coating layer 11' on the gas adsorbing material layer 10' is, for example, housed in a hard case having a gas permeable opening or a cover body 12 such as a gas permeable film, as shown in FIG. 2.

As one example of the gas permeable opening, an upper end of the hard case may have an opening at a surface thereof.

The gas adsorbing material layer 10' is a layer having adsorption performance of a target gas (i.e., is capable of adsorbing a target gas) and includes an adsorbing composition (a gas adsorbing material particle, 10).

The adsorbing composition 10 may include an additive material particle having moisture adsorption performance and a layer of a gas adsorbing metal formed on a surface of the additive material particle, wherein the gas adsorbing metal adsorbs a target gas and is inactivated by moisture.

In an embodiment, the layer of the gas adsorbing metal is attached on a surface of the additive material particle, and in an embodiment, the term "attached" refers to a state in which the additive material particle is coated by the gas adsorbing metal. As used herein, the "attaching method" may be a metallic bond, a chemical bond, or a physical bond between the gas adsorbing metal and the additive material particle, or may be an interface state between the gas adsorbing metal and the additive material particle, but is not limited thereto.

The gas adsorbing metal may be variously selected according to a type of target gas to be adsorbed. For example, when the target gas is nitrogen, the gas adsorbing metal may include Li, V, Zr, or a combination thereof, for example, Li and/or, a Li alloy. In one embodiment, the gas adsorbing metal is an alloy of Li and an alkaline-earth metal. For example, a Ba—Li alloy having high nitrogen gas adsorption characteristics may be used.

The gas adsorbing metal may be a mixture of two or more of the metals and/or alloys and the gas adsorbing metal may include about 90 mass % or greater of the Ba—Li alloy in order to obtain effective nitrogen adsorption in a reduced pressure environment.

The additive material particle controls a concentration of the gas adsorbing metal, that is, a metal content per unit mass of the gas adsorbing material body 7. As a result, because the metal content per unit mass of the gas adsorbing material body 7 is reduced according to the amount of the additive material particle, a reaction rate is limited even though the adsorbing composition 10 reacts with water. As a result, generation of a combustible gas in an amount which is above a regulation criteria at once may be suppressed during, for example, disuse of the gas adsorbing material body 7.

In an embodiment, the material for the additive material particle is not particularly limited as long as it does not affect the gas adsorption performance of the gas adsorbing metal. In the case where the gas adsorbing metal is a nitrogen gas adsorbing metal, the additive material particle may be an inorganic oxide, and for example, may be an oxide of an alkaline-earth metal such as calcium oxide, magnesium oxide, or strontium oxide. A combination comprising at least one of the foregoing may also be used. Among them, for example calcium oxide may adsorb moisture even at a very low water vapor pressure.

The additive material particle may be a mixture of two or more inorganic oxides and may include about 90 mass % or greater of calcium oxide so that a generation amount of a combustible gas may be reduced and simultaneously the gas adsorbing metal may maintain excellent gas adsorption performance by adsorbing moisture.

A hygroscopic inorganic oxide may be included separately from the gas adsorbing material body 7, or may be included in the gas adsorbing material body 7, so that a use environment state of the gas adsorbing material body 7 may be maintained.

A particle diameter of the additive material particle may be less than or equal to about 500 µm, so as not to reduce the gas adsorption performance of the adsorbing composition 10. A lower limit of the particle diameter of the additive material particle is not particularly limited, and may be a minimum particle diameter of the existing additive material particle.

For example, when the additive material particle is an inorganic oxide having excellent moisture adsorption characteristics such as calcium oxide, the inorganic oxide may inevitably absorb moisture in air even it is heat-treated during the process of making the gas adsorbing material body 7. Accordingly, a simple mixing of the gas adsorbing metal with the additive material particle may cause inactivation of the gas adsorbing metal by moisture which is adsorbed during the manufacturing process.

It has been advantageously discovered by the present inventors that a gas adsorption performance activation state of the gas adsorbing metal may be maintained by attaching the gas adsorbing metal to a surface of the additive material particle, when the gas adsorbing particle is in an activation state having gas adsorption performance, as described above. This is considered by a result that the surface of the additive material particle is coated with the gas adsorbing metal and thus a moisture absorption reaction of the additive material particle is suppressed. In an embodiment, the additive material particle controls a concentration of the gas adsorbing metal and thus is referred to as "a mother material" or "a base material" of the gas adsorbing metal.

An average thickness of the layer of the gas adsorbing metal formed on a surface of the additive material particle may be, for example, less than or equal to about 50 µm, less than or equal to about 45 µm, less than or equal to about 40 µm, less than or equal to about 37 µm, less than or equal to about 35 µm, less than or equal to about 30 µm, less than or equal to about 25 µm, less than or equal to about 20 µm, less than or equal to about 15 µm, less than or equal to about 10 µm, less than or equal to about 7 µm, or less than or equal to about 6.6 µm, may be for example, greater than or equal to about 0.1 µm, greater than or equal to about 0.2 µm, greater than or equal to about 0.3 µm, greater than or equal to about 0.4 µm, greater than or equal to about 0.5 µm, greater than or equal to about 0.6 µm, greater than or equal to about 0.65 µm, greater than or equal to about 0.7 µm, greater than or equal to about 0.8 µm, greater than or equal to about 0.9 µm, greater than or equal to about 1.0 µm, greater than or equal to about 1.1 µm, greater than or equal to about 1.2 µm, or greater than or equal to about 1.3 µm, and may be for example about 0.65 µm to about 37 µm, for example about 1.3 µm to about 6.6 µm.

Accordingly, because the layer of the gas adsorbing metal may be formed uniformly on the surface of the additive material particle, a thickness of the layer of the gas adsorbing metal is thin and thus an amount of a hydrogen gas generated at one time may be reduced and a generation amount of combustible gas may be also reduced even though the adsorption material particle may contact water by the water spraying treatment.

In an embodiment, the average thickness of the layer of the gas adsorbing metal refers to a calculated thickness of the layer of the gas adsorbing metal formed per one of the additive material particle, and is according to each of particle radius, density, and mass of the additive material particle and the gas adsorbing metal.

A shape of the gas adsorbing material layer 10' is not particularly limited and may include various shapes of a pellet shape, a block shape, a sphere shape, and the like. In an embodiment, the shape of the gas adsorbing material layer 10' is a pellet shape for handling performance improvement.

A size of the gas adsorbing material layer 10' may be determined by considering the adsorption performance of a target gas and handling performance improvement. A maximum width or the largest dimension of the gas adsorbing material layer 10' may be for example greater than or equal to about 3 mm, greater than or equal to about 4 mm, greater than or equal to about 5 mm, greater than or equal to about 6 mm, or greater than or equal to about 7 mm, may be for example less, than or equal to about 50 mm, less than or equal to about 40 mm, less than or equal to about 30 mm, or less than or equal to about 20 mm, and may be for example, about 3 mm to about 50 mm, about 5 mm to about 30 mm, or about 7 mm to about 20 mm.

A maximum thickness or the shortest dimension of the gas adsorbing material layer 10' may be for example greater than or equal to about 0.5 mm, greater than or equal to about 1.0 mm, greater than or equal to about 1.5 mm, greater than or equal to about 2.0 mm, may be for example, less than or equal to about 50 mm, less than or equal to about 40 mm, less than or equal to about 30 mm, less than or equal to about 20 mm, or less than or equal to about 10 mm, and may be for example, about 0.5 mm to about 50 mm, about 1 mm to about 30 mm, or about 2 mm to about 10 mm.

Alternatively, the compression molded body may be a granule shape or a pellet-type massive body. In addition, the massive body may be disposed inside of two or more core materials 6.

In an embodiment, the coating layer 11' includes a moisture adsorbing material.

The moisture adsorbing material is not particularly limited as long as it is a material having absorption properties similar to the additive material particle. For example, when considering improvement of moisture adsorption performance, an alkaline-earth metal oxide such as a calcium oxide, a magnesium oxide, a strontium oxide, or a combination thereof may be used. Accordingly, a direct contact between the gas adsorbing material layer 10' and water may be prevented and thus deterioration of adsorption characteristics by moisture may be inhibited.

In addition, the coating layer 11' may further include a gas adsorbing material for a coating layer capable of adsorbing at least one of oxygen and hydrogen. Examples of the gas adsorbing material for the coating layer 11' may include titanium oxide, palladium oxide, a mixture thereof, or a composite thereof. Accordingly, moisture, oxygen, hydrogen, and the like, may be adsorbed in addition to a target gas (nitrogen etc.) inside a vacuum insulation material, and thus a vacuum degree inside the vacuum insulation material may be maintained over an extended period of time.

Considering improvement of target gas adsorption performance of the gas adsorbing material layer 10' and improvement of handling performance of the gas adsorbing material body 7, a maximum thickness of the coating layer 11' may be for example greater than or equal to about 1 mm, greater than or equal to about 2 mm, greater than or equal to about 3 mm, greater than or equal to about 4 mm, or greater than or equal to about 5 mm, may be for example less than or equal to about 60 mm, less than or equal to about 50 mm, less than or equal to about 40 mm, less than or equal to about 30 mm, or less than or equal to about 20 mm, and may be for example, about 1 mm to about 60 mm, about 2 mm to about 0 mm, or about 5 mm to about 20 mm.

A maximum thickness of the coating layer 11' according to an embodiment may be calculated from a size of the gas adsorbing material layer 10', a size of the gas adsorbing material body 7, and a thickness of the cover body 12, or may be calculated from a size of the gas adsorbing material layer 10' and a size of a molded body obtained by forming the coating layer 11' around the gas adsorbing material layer 10'.

When the coating layer 11' having a uniform thickness is formed on a surface of the gas adsorbing material layer 10', the gas adsorbing material body 7 may have the same shape as the gas adsorbing material layer 10'.

In addition, in an embodiment, the coating layer 11' may be formed with a partially different thickness. In this case, a shape of the gas adsorbing material body 7 may be the same as that of the gas adsorbing material layer 10' or may have different various shapes (e.g., a pellet shape, a block shape, or a sphere shape).

In an embodiment, the gas adsorbing material body 7 is included under a reduced pressure environment within the vacuum insulation material 1, and thereby low thermal conductivity under a reduced pressure environment may be maintained. For example, gases in micropores of the core material 6 inside of the vacuum insulation material 1 under a reduced pressure environment, or invasion gases adsorbed under reduced pressure environment over an extended period of time.

In an embodiment, "under a reduced pressure environment" refers to a pressure environment which is small relative to atmospheric pressure. A pressure condition for realizing a vacuum insulation environment may be, for example, less than or equal to about 100 pascals (Pa), less than or equal to about 10 Pa, or less than or equal to about 0.01 Pa. In addition, the gas adsorbing material body 7 of the present disclosure may be used for a refrigerator and in this case, gas adsorption performance of the gas adsorbing material body 7 may be desirably maintained in a low temperature environment (e.g., around −30° C.).

Method of Making Adsorbing Composition

Figure 3:
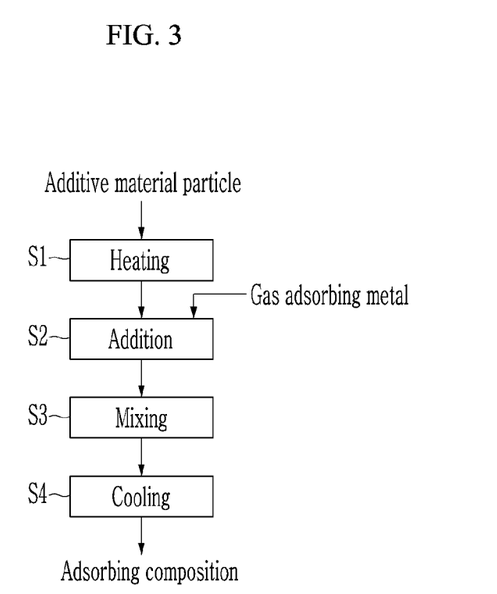
FIG. 3 is a flowchart of a method of making an adsorbing composition, according to an embodiment.

FIG. 3 is a flowchart showing a method of making an adsorbing composition according to an embodiment Hereinafter, a method of making an adsorbing composition is performed under an inert gas atmosphere in order to suppress degradation/ignition of the adsorbing composition 10. Examples of the inert gas may be an argon gas having a purity of about 99.99%.

First, as shown in FIG. 3, the additive material particle is pre-heated (heating process, S1).

A heating means may be used to pre-heat the additive material particle, for example, a hot plate, an oven, and the like. A heating temperature may be controlled to be a temperature which is greater than or equal to a melting point of the gas adsorbing metal that is added in a post-described addition process so that the gas adsorbing metal may be in a molten state. The heating temperature and may be, for example, controlled to be about 200° C. to about 1,500° C., about 300° C. to about 1,200° C., or about 400° C. to about 800° C.

When a calcium oxide as the additive material particle and a Ba—Li alloy as the gas adsorbing metal are used respectively to form the adsorbing composition 10, the heating temperature to melt the Ba—Li alloy sufficiently and to disperse the Ba—Li alloy in the calcium oxide uniformly, or mix them sufficiently, may be for example about 400° C. to about 600° C., about 450° C. to about 550° C., or about 480° C. to about 520° C.

A heating time to heat the entire amount of the additive material particle uniformly may be, for example, about 10 seconds (sec) to about 5 minutes (min), about 20 sec to about 3 min, or about 30 sec to about 1 min.

Then, the gas adsorbing metal is added to the heated additive material particle (addition process, S2).

Then, the gas adsorbing metal in a molten state is mixed with the additive material particle uniformly with each other to coat a surface of the additive material particle with the gas adsorbing metal, and thereby the layer of the gas adsorbing metal is formed on a surface of the additive material particle (mixing process, S3).

A mixing means may be, for example, an automatic mortar and pestle, a mixing mill, and the like.

In the adsorbing composition 10, a ratio of the gas adsorbing metal and the additive material particle may be determined by considering a variety of factors such as a concentration of a target gas with a reference to an environment where the gas adsorbing material body 7 is to be used, a volume of a space where the gas adsorbing material body 7 is applied, an amount of combustible gas generated through a reaction of a metal with water when the gas adsorbing material body 7 is released, and the like For example, when the additive material particle is included in an amount which is greater than the amount of the gas adsorbing metal, a generation amount of a combustible gas may be reduced, however, the combustible gas adsorption performance of the gas adsorbing metal may be deteriorated, or a capacity of the gas adsorbing material body 7 may be increased. On the contrary, when the additive material particle is included in an amount which is less than the amount of the gas adsorbing metal, the generation amount of the combustible gas may be increased.

Accordingly, a ratio of the material particle and the gas adsorbing metal may be variously adjusted, as long as the generation amount of the combustible gas rapidly generated when the adsorbing composition 10 is reacted with water falls within a range which satisfies a value which is less than a regulation criteria (about 200 cc/g).

For example, when the gas adsorbing metal is for example included in an amount of less than or equal to about 45 mass %, less than or equal to about 40 mass %, less than or equal to about 35 mass %, less than or equal to about 30 mass %, less than or equal to about 25 mass %, less than or equal to about 20 mass %, less than or equal to about 15 mass %, or less than or equal to about 10 mass %, for example, greater than or equal to about 1 mass %, greater than or equal to about 2 mass %, greater than or equal to about 3 mass %, or for example about 1 mass % to about 45 mass % or about 2 mass % to about 10 mass %, based on a total mass of the additive material particle and the gas adsorbing metal, the combustible gas may be controlled to be less than or equal to a regulation criteria (i.e., less than or equal to about 200 cc/g).

On the other hand, the mixture obtained through the mixing process is cooled down to room temperature to obtain the adsorbing composition 10 (a cooling process, S4).

The cooling may be for example natural cooling and the like.

According to a method of making the adsorbing composition according to an embodiment, the additive material particle may be uniformly mixed with the gas adsorbing metal by uniformly heating the additive material particle in advance during the heating with consideration to a subsequent adding/mixing process to rapidly promote melting of the gas adsorbing metal added thereto.

Since the gas adsorbing metal is formed to have a uniform thickness on the surface of the additive material particle, the gas adsorbing metal may be effectively suppressed from a moisture absorption reaction of the additive material particle during making of the adsorbing composition 10 and from deterioration of gas adsorption performance of the gas adsorbing metal.

In addition, the generation amount of combustible gas may be reduced by disposing the gas adsorbing metal on the surface of the additive material particle.

Method of Making Gas Adsorbing Material Body

Figure 4:
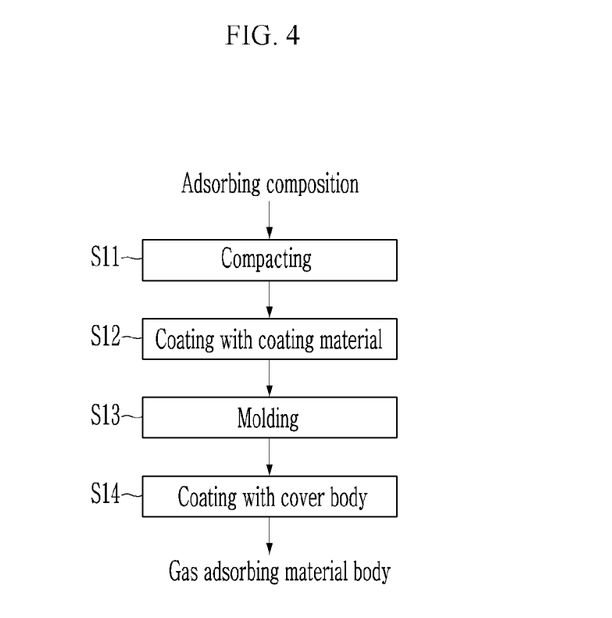
FIG. 4 is a flowchart of a method making a gas adsorbing material body, according to an embodiment.
Figure 5:
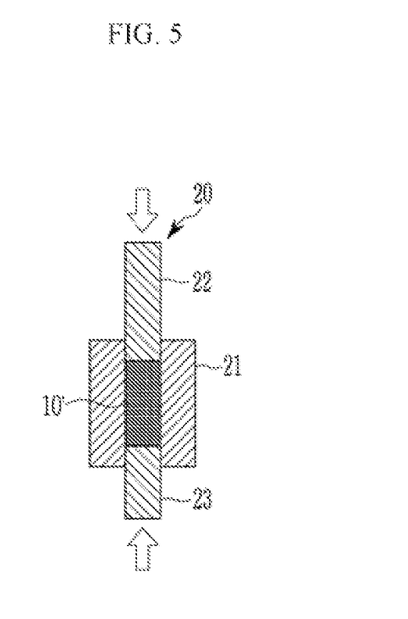
FIG. 5 is a schematic cross-sectional view illustrating the compacting process of FIG. 4.
Figure 6:
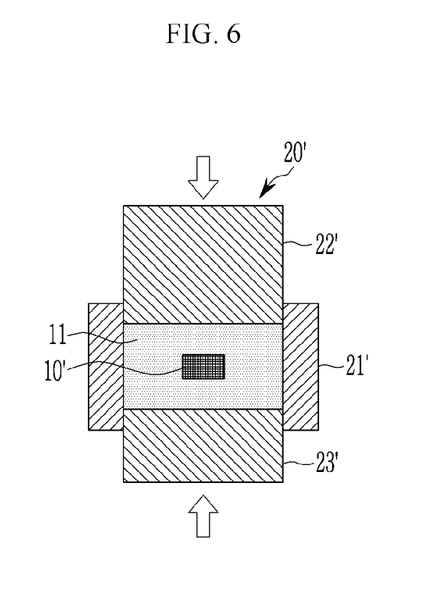
FIG. 6 is a schematic cross-sectional view illustrating the molding process of FIG. 4.

FIG. 4 is a flowchart showing a method making a gas adsorbing material body according to an embodiment, FIG. 5 is a schematic cross-sectional view illustrating a compacting process of FIG. 4, and FIG. 6 is a schematic cross-sectional view illustrating a molding process of FIG. 4.

The gas adsorbing material body 7 is made using the method illustrated in FIG. 4, and using the adsorbing composition 10 obtained using the above-described method as the starting material.

Hereinafter, a method of making a gas adsorbing material body is performed under an inert gas atmosphere in order to suppress degradation/ignition of the adsorbing composition 10 and the gas adsorbing material body 7. Examples of the inert gas may be an argon gas having a purity of about 99.99%.

First, the adsorbing composition 10 is formed into a compact using a pressure molder 20 as shown in FIG. 5, to obtain a gas adsorbing material layer 10' (compact process, S11).

Specifically, as shown in FIG. 5, the gas adsorbing material layer 10' molded between operation frames (not shown), is obtained by putting the adsorbing composition 10 in a die 21 of the pressure molder 20 in which an upper punch 22 and a lower punch 23 are disposed, and lowering a cylinder (not shown) from information of the upper punch 22.

The shape of the gas adsorbing material layer 10' has no particular limit but may, for example be, formed into a pellet, a ring, and the like.

In order to obtain the gas adsorbing material layer 10' having a predetermined shape, a pressure is applied during the pressure molding. The applied pressure may be, for example, about 10 kilonewtons (kN) to about 100 kN, about 20 kN to about 80 kN, or about 30 kN to about 60 kN.

The obtained powder compact of the gas adsorbing material layer 10' is coated with the coating material 11 (coating process, S12) and molded with a pressure into a predetermined shape (e.g. a pellet and the like) (molding process, S13) to form a coating layer 11'.

The coating material 11 is a material forming the coating layer 11' and for example, includes the moisture adsorbing material as described above. The moisture adsorbing material may include any material having absorption properties similar to the additive material particle, and without a particular limit, but with a consideration to improving moisture adsorption performance. For example, the moisture adsorbing material may include an alkaline-earth metal oxide such as calcium oxide, magnesium oxide, strontium oxide, or the like, or a combination thereof.

In addition, the coating material 11 further includes a gas adsorbing material for a coating layer which is capable of absorbing at least one of oxygen and hydrogen. Examples of the gas adsorbing material for the coating layer may include titanium oxide, palladium oxide, a mixture thereof, or a composite thereof. Accordingly, the gas adsorbing material may absorb moisture, oxygen, hydrogen, and the like, in addition to a target gas (nitrogen etc.), inside the vacuum insulation material and thus maintains a vacuum degree inside the vacuum insulation material over an extended period of time.

When the coating material 11 includes the gas adsorbing material for a coating layer, a content of the moisture adsorbing material may be, for example, about 96 mass % to about 99 mass %, about 97 mass % to about 99 mass %, or about 98 mass % to about 99 mass %, based on a total mass of the coating material 11, and considering improvement of moisture absorption performance.

A content of the gas adsorbing material for a coating layer in the coating material 11 may be for example about 1 mass % to about 4 mass %, about 1 mass % to about 3 mass %, or about 1 mass % to about 2 mass %, based on a total mass of the coating material 11 and considering improvement of oxygen and/or hydrogen adsorption performance.

Specifically, as shown in FIG. 6, the gas adsorbing material layer 10' is put in a die 21' of a pressure molder 20' in which an upper punch 22' and a lower punch 23' are disposed, and the gas adsorbing material layer 10' is coated with the coating material 11.

Subsequently, as shown in FIG. 5, the gas adsorbing material layer 10' and the coating material 11 are molded by applying a pressure between the upper punch 22' and the lower punch 23' to form a coating layer 11' which coats the gas adsorbing material layer 10'. The molded product may have the same shape as the gas adsorbing material layer 10', and may be, without a particular limit, for example, a pellet shape, a ring shape, and the like.

A pressure applied during the pressure molding may be for example about 10 kN to about 100 kN, about 20 kN to about 80 kN, or about 30 kN to about 60 kN. The amount of pressure is sufficient so that the gas adsorbing material body 7 may have a predetermined shape.

Lastly, the complete molded product is coated by the cover body 12 such as a hard case and the like (housing process, S14) to obtain the gas adsorbing material body 7, according to an embodiment.

According to the embodiment, a gas adsorbing material body is capable of effectively suppressing generation of a combustible gas and simultaneously suppressing deterioration of target gas adsorption performance.

Hereinafter, the embodiments are described with reference to examples and comparative examples. The following examples and comparative examples are exemplary but do not limit the scope of the present disclosure.

EXAMPLES

Constitution and measurement results of Examples 1 to 5 and Comparative Examples 1 and 2 are shown in Table 1.

TABLE 1

| | Gas adsorbing metal | Concentration of gas adsorbing metal [mass %] | Shape | Average thickness of layer of gas adsorbing metal [μm] | Nitrogen adsorption amount [cc/g] | Generation amount of hydrogen [cc/g · h] |
|---|---|---|---|---|---|---|
| Example1 | $BaLi_4$ | 2 | Powder | 1.3 | 3.34 | 12.5 |
| Example2 | $BaLi_4$ | 3 | Powder | 1.9 | 4.30 | 19.5 |
| Example3 | $BaLi_4$ | 5 | Powder | 3.2 | 4.42 | 19.9 |
| Example4 | $BaLi_4$ | 10 | Powder | 6.6 | 4.47 | 29.6 |
| Example5 | $BaLi_4$ | 5 | powder compact | 3.2 | 3.14 | 19.9 |
| Comparative Example1 | $BaLi_4$ (commercial products) | 100 | powder compact (contained in a stainless steel can) | — | 1.96 | 255 |
| Comparative Example2 | $BaLi_4$ | 5 | Powder | — | 3.50 | 27.0 |

Example 1

2.45 g of calcium oxide (CaO) (average particle diameter: 200 μm, Yoshizawa Lime Industry Co., Ltd.) is put in a crucible under an Ar atmosphere and heated on a hot plate for 15 minutes at 500° C. Subsequently, 0.05 g of $BaLi_4$ (average particle diameter: less than or equal to 300 μm, purity: greater than or equal to 99%, Pure Chemical) is added to the heated calcium oxide and uniformly mixed therewith while $BaLi_4$ is molten. Then, the mixture is cooled down to room temperature to obtain a particle-phased adsorbing composition in which $BaLi_4$ is adhered on the surface of calcium oxide. In the $BaLi_4$/CaO particle (the adsorbing composition), an average thickness $T_{bcb}$ of a $BaLi_4$ layer formed on the surface of a CaO core particle is calculated according to Equation 1.

$$T_{bcb} = \{[(V_b/N_{bc}) + V_{bcc}] \times [3/(4 \times 3.14)]\}^{1/3} - r_{bcc} \quad \text{Equation 1}$$

As shown in Table 2, $V_b$ indicates a volume of $BaLi_4$, $N_{bc}$ indicates the number of $BaLi_4$/CaO particles, $Vb_{cc}$ indicates a volume of a CaO core particle per one $BaLi_4$/CaO particle, and $r_{bcc}$ indicates radius (presumption) of the CaO core particle in the $BaLi_4$/CaO particle.

TABLE 2

| | | | Calculation Equation | Calculation value |
|---|---|---|---|---|
| $BaLi_4$ | Mass | $M_b$ | — | 0.05 g |
| | Density | $d_b$ | — | 1.76 g/cm³ |
| | Volume | $V_b$ | $M_b/d_b$ | 2.84 × 10⁻² cm³ |
| CaO | Mass | $M_c$ | — | 2.45 g |
| | Density | $d_c$ | — | 3.34 g/cm³ |
| | Volume | $V_c$ | $M_c/d_c$ | 0.734 cm³ |
| $BaLi_4$/CaO particle | Radius of CaO core particle (presumption) | $r_{bcc}$ | — | 100 μm |
| | Volume of CaO core particle per one particle | $V_{bcc}$ | $(4\pi r_{bcc}^3)/3$ | 4.19 × 10⁶ μm³ |
| | The number of particle | $N_{bc}$ | $V_c/V_{bcc}$ | 1.75 × 10⁵ |

TABLE 2-continued

| | | Calculation Equation | Calculation value |
|---|---|---|---|
| Volume of $BaLi_4$ layer per one particle | $V_{bcb}$ | $V_b/N_{bc}$ | 1.62 × 10⁵ μm³ |
| Volume of one particle | $V_{bc}$ | $V_{bcc} + V_{bcb}$ | 4.35 × 10⁶ μm³ |
| Radius of particle | $r_{bc}$ | $(3 V_{bc}/4\pi)^{1/3}$ | 101.3 μm |
| Average thickness of $BaLi_4$ layer | $T_{bcb}$ | $r_{bc} - r_{bcc}$ | 1.3 μm |

Using Equation 1, the $BaLi_4$ layer has an average thickness $T_{bcb}$ of 1.3 μm in the $BaLi_4$/CaO particles as shown in Table 2.

Then, an adsorption amount of nitrogen gas is measured using a gas adsorption characteristics-measuring apparatus, and a generation amount of hydrogen gas is measured based on a third class of safety test of a Japanese Fire Service Act. The nitrogen adsorption may be measured using the device illustrated in FIG. 7.

Figure 7:
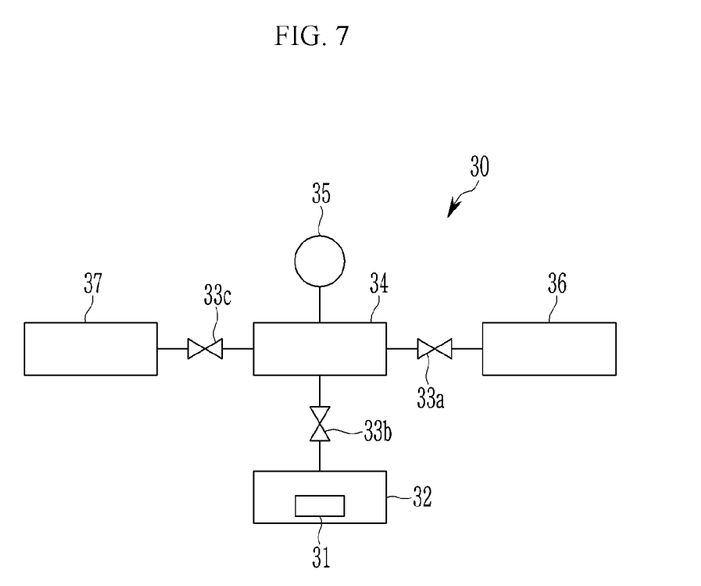
FIG. 7 is a schematic view of a device for measuring nitrogen adsorption.

FIG. 7 is a schematic view showing the device for measuring nitrogen adsorption.

Referring to FIG. 7, a sample 31 is put in a sample chamber 32, and a gas storage 34 and the sample chamber 32 are subjected to a vacuum through first and second valves 33a and 33b by using a vacuum pump 36 until the pressure is less than or equal to 0.1 Pa.

The gas storage 34 is internally adjusted to 60 Pa by opening a third valve 33c after closing the first and second valves 33a and 33b and introducing nitrogen gas in a container 37 into the gas storage 34.

Subsequently, a pressure change of nitrogen gas is measured by opening the second valve 33b to introduce nitrogen gas into the sample chamber 32 after closing the third valve 33c and the using a pressure-measuring gauge 35.

Examples 2 to 4

Each adsorbing composition of Examples 2 to 4 is prepared according to the same method as described in Example 1 except for changing a $BaLi_4$ concentration from 3 mass % to 10 mass %. The same measurements as described in Example 1 are performed.

Example 5

An adsorbing composition of Example 5 is prepared by molding the $BaLi_4$/CaO particle of Example 3 into a powder compact with a pressure.

In other words, 0.5 g of the $BaLi_4$/CaO particle according to Example 3 is pressed with a pressure of 40 kN under an Ar atmosphere by using a cylindrical die having a diameter of 10 mm and a punch to obtain the powder compact. Then, a gas adsorbing material of Example 5 is obtained by putting 1 g of calcium oxide in a cylindrical die having a diameter of 20 mm and a punch, adding the powder compact thereon, and then, adding 1 g of calcium oxide on the powder compact, and pressing the mixture with a pressure of 40 kN.

Subsequently, the same measurements as described in Example 1 were performed on the gas adsorbing material of Example 5.

Comparative Example 1

A commercially-available $BaLi_4$ adsorption material for Comparative Example 1 is evaluated according to the same method as the above-described examples.

Comparative Examples 2 and 3

Each adsorbing composition according to Comparative Examples 2 and 3 is prepared according to the same method as described for Examples 3 and 4, respectively, except that $BaLi_4$ is heated on a hot plate crucible at 500° C. in advance and adding CaO separately heated at 500° C. to the $BaLi_4$.

Subsequently, the same measurement as Example 1 about the adsorbing composition is performed.

Comparison of Examples with Comparative Examples

As shown in Table 1 above, Examples 1 to 5 show an increased nitrogen adsorption amount but a lower hydrogen generation amount than Comparative Example 1.

In addition, Example 3 shows an increased nitrogen adsorption amount but a decreased hydrogen generation amount as compared with Comparative Example 2, and accordingly, $BaLi_4$ is more uniformly mixed with CaO when $BaLi_4$ is added to CaO than when CaO is added to $BaLi_4$.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A gas adsorbing material particle, comprising:
   a core comprising an additive material particle having a moisture adsorption property; and
   a coating layer comprising a gas adsorbing metal disposed on a surface of the additive material particle, wherein the gas adsorbing metal is inactivated by moisture and adsorbs a target gas, and
   wherein an average thickness of the coating layer comprising the gas adsorbing metal is less than or equal to about 37 micrometers.

2. The gas adsorbing material particle of claim 1, wherein the additive material particle comprises about 90 mass percent or greater of calcium oxide, and
   the gas adsorbing metal comprises about 90 mass percent or greater of a Ba—Li alloy.

3. The gas adsorbing material particle of claim 1, wherein a content of the gas adsorbing metal is less than or equal to about 45 mass percent based on a total mass of the additive material particle and the metal.

4. The gas adsorbing material particle of claim 1, wherein an average thickness of the layer of the gas adsorbing metal is about 0.65 micrometers to about 37 micrometers.

5. The gas adsorbing material particle of claim 1, wherein an average thickness of the layer of the gas adsorbing metal is about 1.3 micrometer to about 6.6 micrometers.

6. The gas adsorbing material particle of claim 1, wherein the target gas is nitrogen.

7. A gas adsorbing material body, comprising:
   a gas adsorbing material layer comprising a gas adsorbing material particle comprising
       a core comprising an additive material particle having a moisture adsorption property and
       a coating layer comprising a gas adsorbing metal disposed on a surface of the additive material particle, wherein the gas adsorbing metal is inactivated by moisture and adsorbs a target gas, and wherein an average thickness of the coating layer of the gas adsorbing metal is less than or equal to about 37 micrometers; and
   a coating layer disposed on a surface of the gas adsorbing material layer and comprising a moisture adsorbing material.

8. The gas adsorbing material body of claim 7, wherein the coating layer disposed on the surface of the gas adsorbing material layer further comprises a gas adsorbing material having oxygen and hydrogen adsorption properties.

9. The gas adsorbing material body of claim 8, wherein the moisture adsorbing material is calcium oxide, and
   the gas adsorbing material comprises titanium oxide, palladium oxide, or a combination thereof.

10. The gas adsorbing material body of claim 7, wherein the gas adsorbing material body has a pellet shape.

11. The gas adsorbing material body of claim 7, wherein a maximum thickness of the coating layer disposed on the surface of the gas adsorbing material layer is about 1 millimeter to about 60 millimeters.

12. The gas adsorbing material body of claim 7, wherein a maximum thickness of the coating layer disposed on the surface of the gas adsorbing material layer is about 2 millimeters to about 40 millimeters.

13. The gas adsorbing material body of claim 7, wherein a maximum thickness of the coating layer disposed on the surface of the gas adsorbing material layer is about 5 millimeters to about 20 millimeters.

14. A vacuum insulation material comprising the gas adsorbing material body of claim 7.

* * * * *